United States Patent [19]

Gouda

[11] Patent Number: 5,730,476
[45] Date of Patent: Mar. 24, 1998

[54] CONDUIT COUPLING

[76] Inventor: Osamu Gouda, 628-8, Noborito Tama-ku, Kawasaki, Japan

[21] Appl. No.: 729,444

[22] Filed: Oct. 11, 1996

[30] Foreign Application Priority Data

Oct. 11, 1995 [JP] Japan .................. 7-289293

[51] Int. Cl.$^6$ .................................. F16L 17/02
[52] U.S. Cl. ............... 285/340; 285/369; 285/382
[58] Field of Search .................... 285/390, 382, 285/369

[56] References Cited

U.S. PATENT DOCUMENTS

| | | | |
|---|---|---|---|
| 1,822,056 | 9/1931 | Noble | 285/340 |
| 3,359,021 | 12/1967 | Wurzel et al. | 285/340 X |
| 3,545,794 | 12/1970 | Wise | 285/340 X |
| 3,653,695 | 4/1972 | Dunton et al | 285/340 |
| 5,390,969 | 2/1995 | Guest | 285/340 X |

FOREIGN PATENT DOCUMENTS

| | | | |
|---|---|---|---|
| 602498 | 6/1994 | European Pat. Off. | 285/340 |
| 2155576 | 9/1985 | United Kingdom | 285/340 |

*Primary Examiner*—Dave W. Arola
*Attorney, Agent, or Firm*—Gifford, Krass, Groh, Sprinkle, Patmore, Anderson & Citkowski, P.C.

[57] ABSTRACT

For the purpose of decreasing the tightening torque necessary for a fastening nut in use for conduit coupling, the coupling assembly comprises a gripping member 40 formed as a conical spring member having a central opening formed as a waved circle, a plurality of gripping tabs formed away from each other by an equal angle such as 60° along the inner periphery of the opening, each of the tabs formed as a curve having a curvature convex toward the center of the gripping member, and an end edge 44 of each tab in engagement with the periphery of a conduit with a minimum contact area therebetween.

1 Claim, 7 Drawing Sheets

FIG.1 (1)
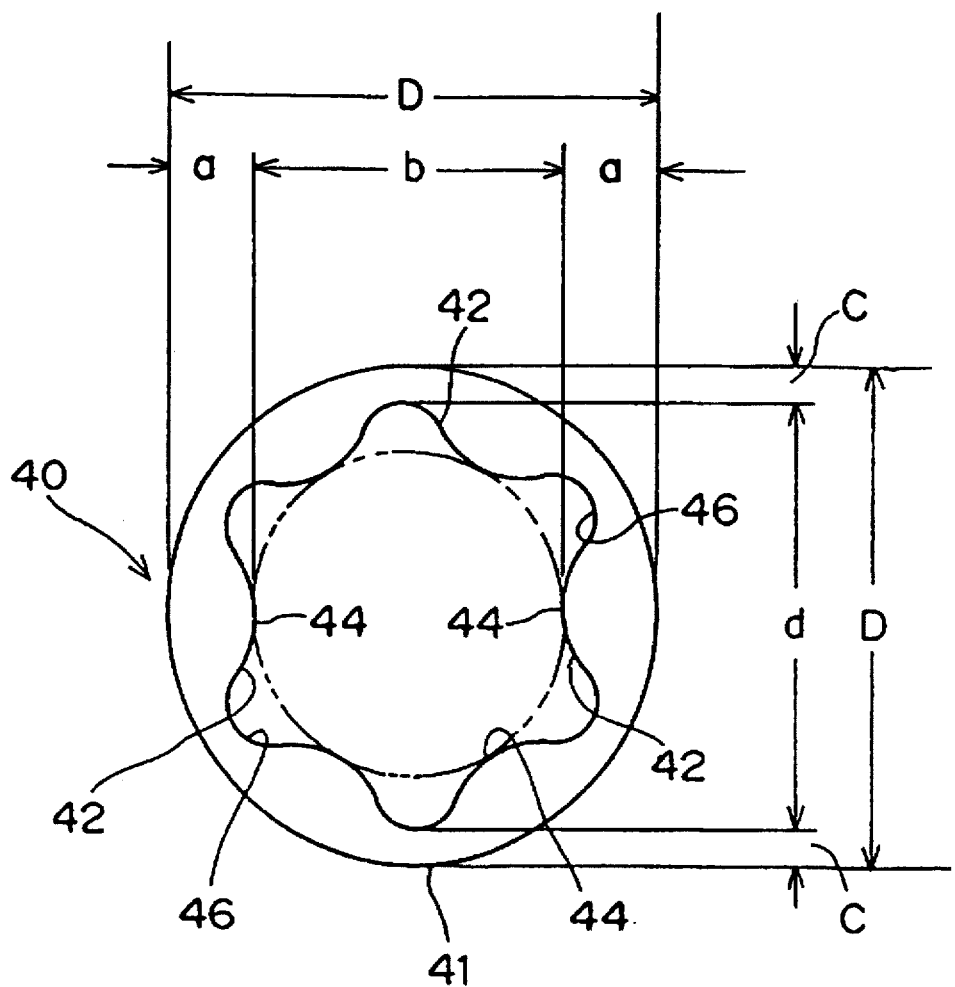
FIG.1 (2)
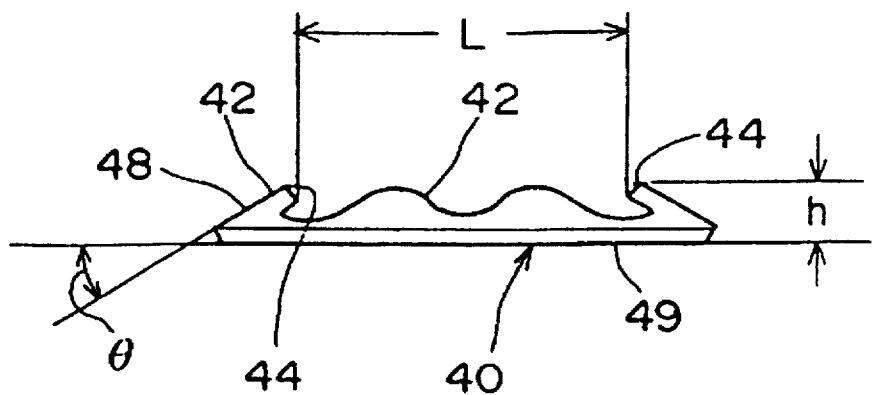

FIG.3 (1)
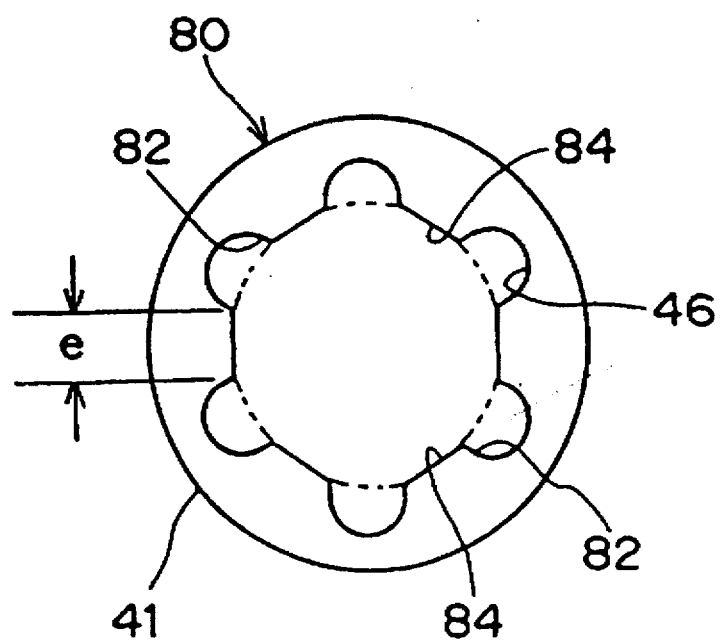
FIG.3 (2)
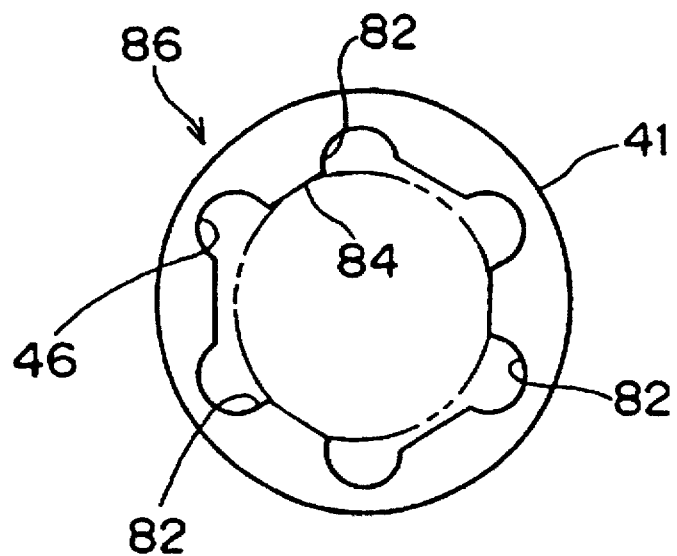

FIG.4 (1)
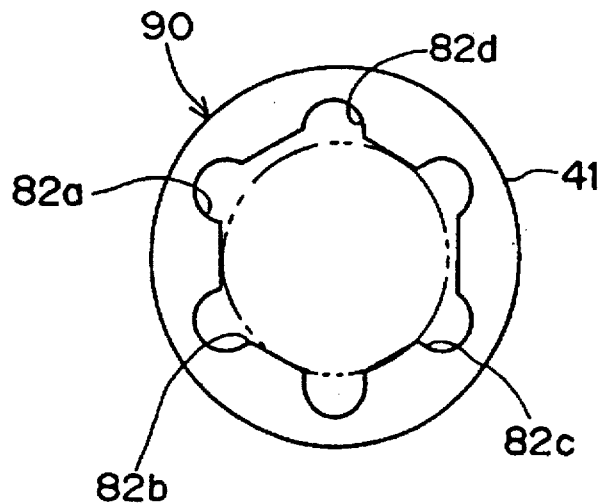
FIG.4 (2)
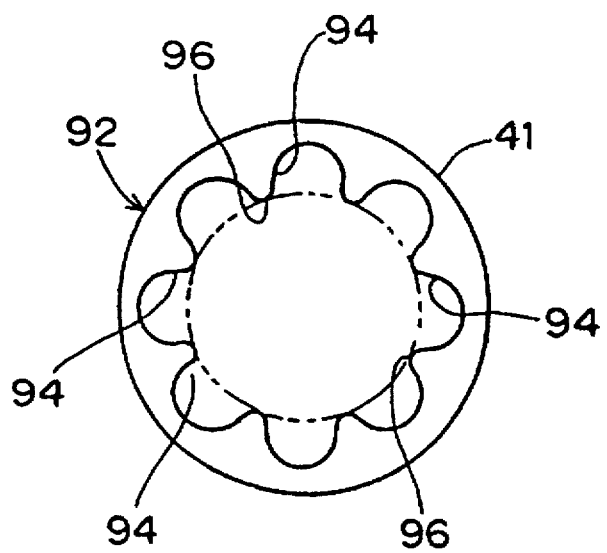
FIG.4 (3)
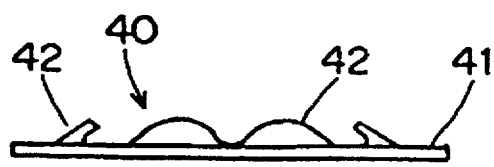

FIG.5 (1) PRIOR ART
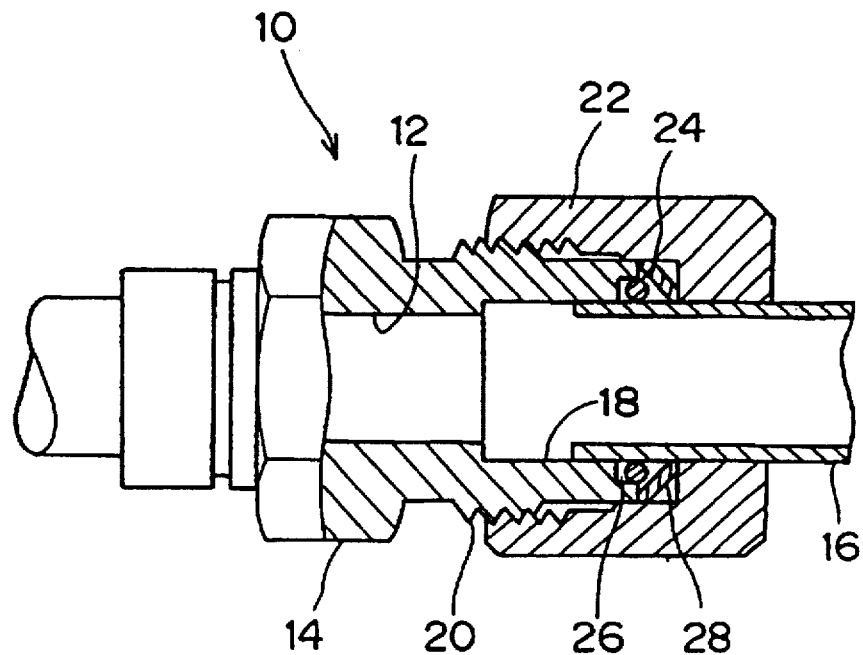
FIG.5 (2) PRIOR ART
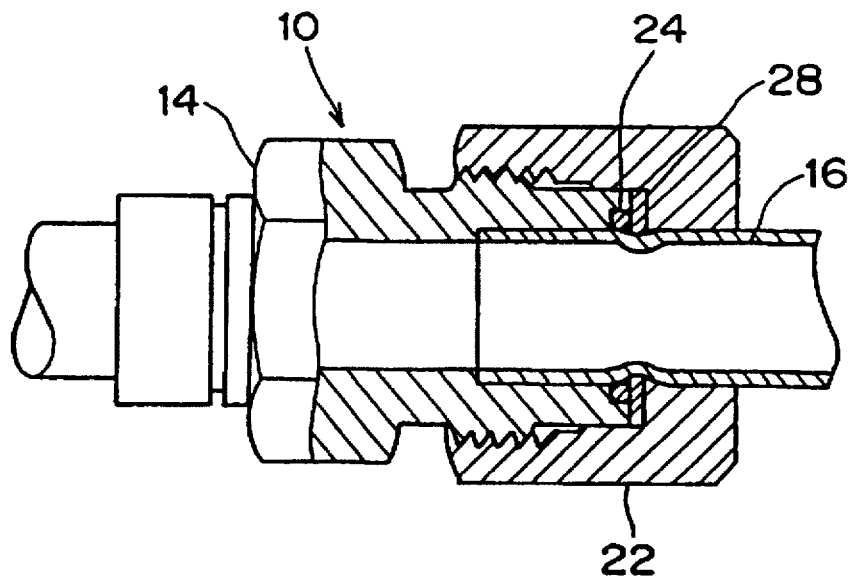

FIG.6 (1)
PRIOR ART
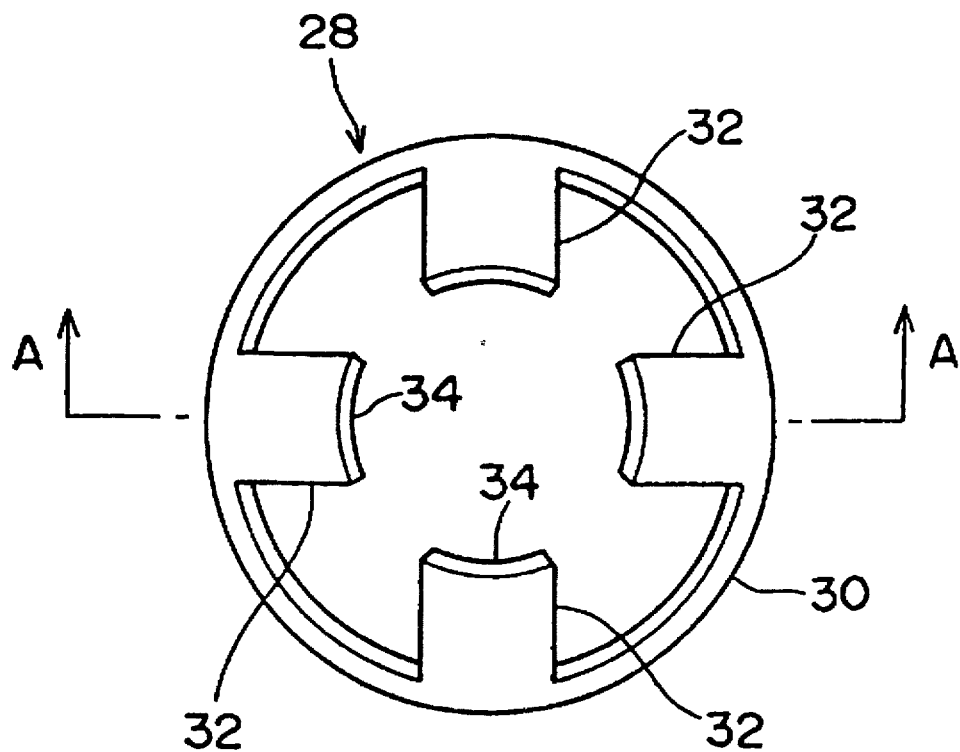
FIG.6 (2)
PRIOR ART
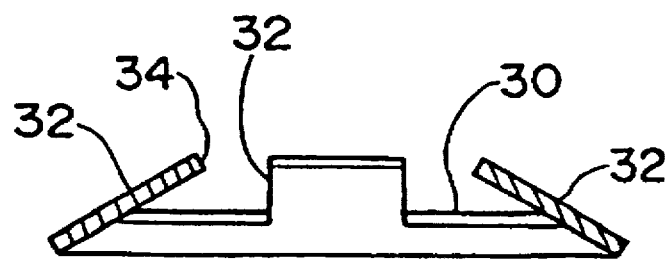

CONDUIT COUPLING

BACKGROUND OF THE INVENTION

1. Field of the Invention

The present invention relates to a conduit coupling for fluid or gas including an improved gripping member or washer whose inner diameter is reduced to firmly retain a conduit or pipe when a fastening nut is tightened.

2. Brief Description of the Prior Art

There are a variety of structures for conduit coupling, such as including a coupling main body and a fastening nut meshed therewith to lock a pair of conduits to each other. Particularly, for locking thin-walled stainless conduits, the coupling structure shown in FIG. 5 is used in general, in which the structure 10 includes in the center of a body 14 a longitudinal bore 12, the end of which is formed as a bore 18 having an increased diameter. Formed on the peripheral surface of body 14 is a screw threaded portion 20, with which a fastening nut 22 formed as a cap nut can mesh. The body 14 has its end formed with an annular recess 26 for receiving an O-ring 24. In addition, provided between the end portion of the body 14 and the inner surface of the nut 22 is a conduit grip, that is, a gripping member or washer 28 formed as a spring member. And, by tightening the nut 22 to axially deform the gripping member 28 to reduce its axial dimension, the O-ring is forced into recess 26 and the inner diameter of gripping member 28 is decreased to grasp the outer surface of conduit 16. FIG. 6(1) and (2) show the general shape of the gripping member 28 employed therein.

The gripping member 28 as shown in FIG. 6, formed of a conical spring, a part of which is cut out, is provided with a plurality of projections each having a arcuate end edge 34, and is pressed and flattened in the axial direction when fastening nut 22 is tightened, wherein the end edges 34 are allowed to circumferentially engage with the outer surface of conduit 16 to retain the same.

As circumferentially engaged in alignment with the outer surface of conduit 16 in the manner of "line engagement", a great deformation stress is applied on gripping member 28 by the conduit 16. When the conduit 16 is formed of stainless steel sized ½ inch (15.88 mm in outer diameter, 0.8 mm in wall thickness) as regulated by Japanese Industrial Standard G3448 and gripping member 28 made of spring steel SUS304 having a thickness of 1.2 mm, the tightening torque required in gripping the conduits by the member 28 to connect the conduits can exceed 1000 kg.cm.wt., and therefore it becomes impractical as difficult to complete manual tightening even using a spanner or monkey wrench.

Also, the application of such an increased tightening torque can cause the conduit 16 to be easily scratched. The broadened contact area between segments 32 and conduit 16 also increases the portions suffered from plastic deformation, which deformed portions would easily get rusty during the use of a long period of time, and furthermore such deformed portions having a reduced thickness are weakened against any stress and anti-vibration ability is lowered, thereby often causes breakdown of the conduit.

SUMMARY OF THE INVENTION

In view of the above disadvantages, an object of the present invention is to provide a conduit coupling including an improved gripping member, capable of reducing the tightening torque necessary for locking the conduits, and also improving durability of the conduits gripped by the improved gripping member.

Accordingly, a conduit coupling of the invention comprises a coupling member having an entry bore and an external male thread; a fastening nut having a flanged portion with a central bore and a female thread to mesh with the thread of coupling member; and a gripping member formed as a conical spring washer having a central opening whose dimension is formed to be reduced when compressed axially, the gripping member formed with a plurality of gripping tabs to be engaged with a periphery of a conduit with a minimum contact area with a cylindrical surface of the conduit. The gripping end of the gripping tab may be formed in the shape of a convex profile of either arcuate or elliptic, or a short straight line, instead of an arcuate profile applied in the conventional conduit coupling. In addition, the gripping member is preferably formed of a resilient material having an increased rigidity, such as spring steel.

According to the invention, the engagement through a minimized contact area provides various advantages in that: a great deformation stress applied on gripping member by the conduit is reduced, the tightening torque required in gripping the conduits by the member to connect the conduits can be lowered to enable manual tightening by using a spanner or monkey wrench at a piping plant, the portions suffered from plastic deformation are minimized, and generation of corrosion during the use of a long period of time is prevented.

BRIEF DESCRIPTION OF THE DRAWINGS

FIG. 1(1) and (2) are a face view and a side view of a gripping member, respectively;

FIG. 3(1) and (2) are each face view of gripping members according to the other embodiments;

FIG. 4(1) and (2) are each face view and FIG. 4(3) is a side view of gripping members according to the still other embodiments;

FIG. 5(1) and (2) are each face view, and FIG. 5(3) is a side view of the prior art gripping members;

FIG. 6(1) is a face view of a prior art gripping member;

FIG. 6(2) is a side sectional view taken along A—A in FIG.6(1); and

DETAILED DESCRIPTION OF THE PREFERRED EMBODIMENTS

FIG.1(1) shows a gripping member after being pressed and flattened in the axial direction, while FIG.1(2) shows the same member in a condition free from any stress applied thereon before being flattened.

Referring now to FIG. 1(1), a gripping member 40 is formed in the shape of a flusto-conical disk made of a resilient material such as resilient steel plate. The gripping member 40 is formed with six radial recesses 46 to divide the inner periphery thereof to form six gripping tabs 42 each formed in the shape of a convex projection with an end portion 44 so as to engage with the cylindrical surface of the conduit in the form of substantially a "point contact", or, more precisely, with sufficiently a minimum contact area as possible. Each adjacent tabs 42 are positioned to each other with an equal angle therebetween. Each of the radial recesses 46 is formed to have an arcuate profile so as to be prevented from any concentrated stress applied thereon and from any crack caused. The complement angle θ which the outer surface forms with the bottom surface of gripping member 40 may be formed preferably between 25° to 35°, and most preferably nearly 30°. With an angle less than 25°, a play necessary for tightening being not always satisfactory, there is fear of causing a reduced anti-withdrawal strength. Decreasing the complement angle in order to increase the anti-withdrawal force can require an increased diameter of gripping member 40, and can cause a cost increase for gripping members, and also an increased size of the coupling assembly. In contrast thereto, increasing the complement angle more than 35° requires an increased initial torque necessary to deform the gripping member 40, which is difficult for manual operation of uniformly deforming the tightening nut. The uneven deformation causes a partial seam especially on the portions inferior in strength and completely flat deformation becomes impossible.

A pair of gripping tabs 42 formed in opposite locations with respect to the center are located with a distance L therebetween, which, although variable depending on the thickness of the conduit used, is preferably larger than the outer diameter D of the conduit by in the order of 0.1 to 0.5 mm. However, the value of L is needed to be a value sufficient to compensate the tolerable error against the nominal dimension of the conduit. An increased value of L more than the outer diameter of a conduit by 0.5 mm can cause a fear of reducing the locking strength for the conduit.

Figure 2:
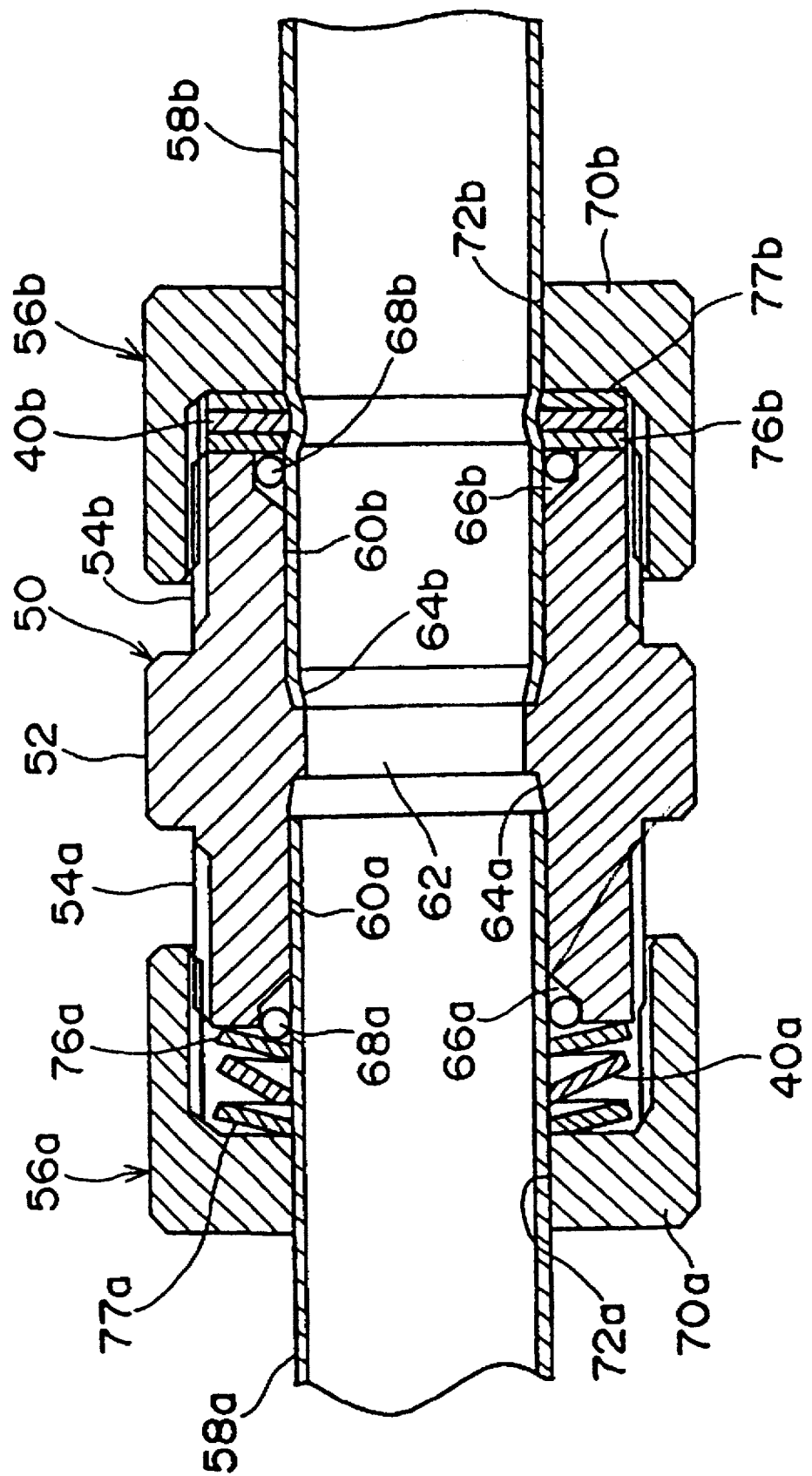
FIG. 2 is a longitudinal sectional view of a conduit coupling assembly.

In operation of gripping member 40 shown in FIG. 2, the left side shows the state before operating the fastening nut 22, and the right side shows the state after completion of locking operation of the conduit, wherein the former and the latter are depicted by each reference numeral with the subscript "a" and "b", respectively, such as 40a and 40b: but, sometimes without subscript a or b, in the case when both states above are generally discussed hereinafter.

As shown, provided axially on the central outer surface of coupling body 50 is a flange 52, on the outer surface of which a pair of male threaded regions 54a and 54b are formed. Flange 52 formed in e.g. a shape of a hexagon can be gripped by the opening of a spanner when operating the tightening nut 56 which has meshed with male thread 54. Also, provided in the center in the radial direction of ends of the body 50 are bores 60a and 60b for receiving the end of a metal conduit 58 of stainless steel or the like. The bores 60a and 60b are also communicated with each other through a stopper portion 62 having a reduced diameter than that of the bores 60a and 60b.

The bores 60a and 60b have each internal end thereof gradually reduced in its diameter to form each of tapered portions 64a and 64b, into which each end of the conduits 58 is forced to engage with each end which is narrowed, when the coupling member 50 and fastening nuts 56a and 56b completely engage with each other. Each of axial bores 60a and 60b has its free end formed with an enlarged portion to be fitted by a seal member such as an O-ring 68a or 68b. Further, disposed between the inner face of fastening nut 56a and the end surface of coupling member 50 are a gripping member 77a and seal retainer 76a. Also, there is shown another set of gripping member 77b and a seal retainer 76b, which are tightened between another end of the coupling member 50 and fastening nut 56b.

By providing seal retainer 76 and gripping member 40 around the conduits 58 to tighten the fastening nut 56, the gripping member 40 together with seal retainer 76 are compressed and flattened in the axial direction. Also, pressed by seal retainer 76, the O-ring 68 is pressed into recess 66. The gripping member 40 having its inner diameter reduced, the gripping edge 44 of each of gripping tabs 42 has its mutual distance decreased to grip around the peripheral surface of conduit 58 with a minimum contact area. As a result, the conduit 58 is locked with the coupling member 50.

In view of the sufficient strength, a gripping member 40 has been prepared using stainless steel sized ½ inch (15.88 mm in outer diameter, 0.8 mm in wall thickness) as regulated by Japanese Industrial Standard G3448 "Light Gauge Stainless Steel Pipes for ordinary Piping". The dimension of the gripping member 40, after locking the conduit 58, is as follows:

the outer diameter D is 23.5 mm;

the height of gripping tab 42, namely the distance "a" measured from the end of the base portion 41 to the end of tab 42 in the radial direction, is 4.4 mm;

the mutual distance "b" between gripping tabs 42 positioned at opposite sides to each other is 14.7 mm;

the radius of curvature of the recess 46 is 1.8 mm; and the distance "C" from the bottom of recess 46 to the periphery is 2.2 mm.

The member thus pressed was configured into a conical spring member as shown in FIG. 1(2), in which the complement angle of the flusto-cone is 32°, and the distance L between the opposed tabs 42 after being formed is 16.1 mm and the height is 3 mm.

The gripping member 40 thus formed was placed between a seal retainer 76 and a conical spring 77, a fastening nut 56 was tightened by a torque wrench, and the gripping member 40 was compressed and flattened in the axial direction.

As a result, with about 400 kg.cm.wt. as the amount of the tightening torque which was largely reduced compared with the conventional gripping member, it has been proved that the conduit was able to be satisfactorily retained, which means the conduit coupling can be easily achieved in a piping cite using a spanner or a monkey wrench in manual.

Also, as discussed above, the conduit is prevented from any of scratches and conduits are connected to each other with a minimized tightening torque.

Also, the squeezing effect is enhanced by providing chamfer for both edges of the gripping ends 44 in the thickness direction, together with providing a round for each edged portion, such as a round of 0.2 mm for 0.8 mm in plate thickness, or 0.3 to 0.4 mm for 1.2 mm in plate thickness.

Applying a suitable lubricant serves to prevent undesirable friction to further reduce the tightening torque, to prevent occurrance of scratches, to minimize the plastic deformation of the conduit, and to enhance anti-vibration to prevent corrosion or damage of conduits. More specifically, owing to facility of piping and light weight of conduits, it is possible to prevent a serious accident such as breakdown, caused by great oscillation such as an earthquake often occurring in the conventional process where conduits having the weight of three times are threaded at ends thereof.

Figure 7:
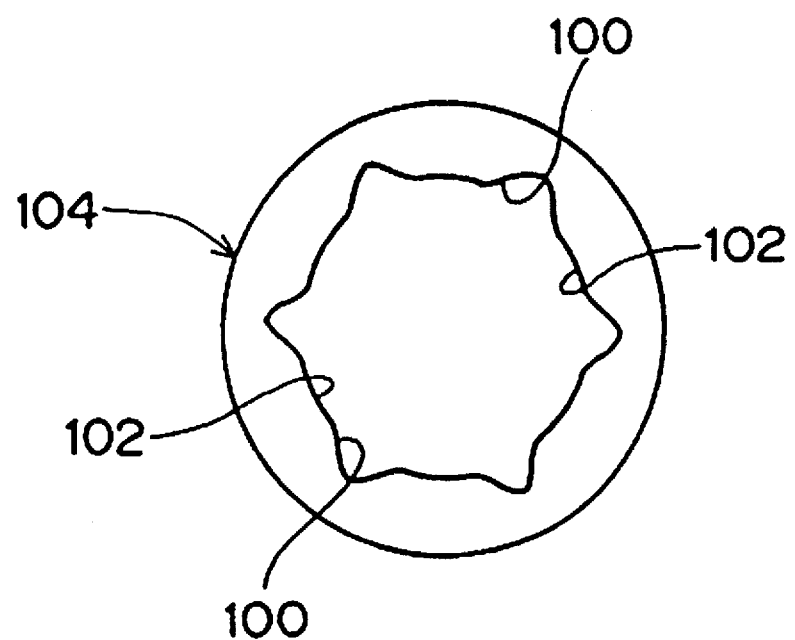
FIG. 7 is a face view of a gripping member as an comparative example.

For the purpose of comparison, an almost customarily used gripping member 104 (1.2 mm in plate thickness) shown in FIG. 7 was also prepared and tested for tightening property, in which each tab 100 has an arcuate recess 102 so as to engage with the conduit in the manner of arcuate-arcuate contact. The result has proved that the amount of tightening torque varied through the steps of the following approximate values:

1000 kg.cm.wt at the initial squeezing of the conduit;

1100 kg.cm.wt in the course of being squeezed of the conduit;

1300 kg.cm.wt just before completion of tightening operation by the fastening nut; and 1400 kg.cm.wt at completion of tightening operation. The acute corner formed at each end of edge 102 becomes a compulsorily fastened position, thereby the torque being increased and further causing scratch of the conduit.

Another embodiment of a gripping member 80 in FIG. 3(1) provided with six circularly formed recesses 46 to divide the inner periphery to form six gripping tabs 82 each having substantially a straight lined edge 84, each of which forms a portion of an edge of a regular hexagon as shown in FIG. 3, and each can tangentially engage with the cylindrical surface of a conduit in the manner of substantially point or minimum area engagement. The measurement of the fastening torque, with a width of tab 84 of 4 mm and the other dimension of the same as the previous embodiment, proved to provide a maximum tightening torque of approximately 700 kg.cm wt.

A gripping member 86 shown in FIG. 3(2) is modified from the member 80 of FIG. 3(1) by removing three tabs to leave the intermediate three tabs 84 away from each other by an angle of 120°. By leaving merely three tabs 82, the tightening torque has reduced to nearly 350 kg.cm.wt, half the value of the gripping member of FIG. 3(1), as a result of the measuring the torque under the same condition as above.

In FIG. 1 also, the gripping member 40 may have gripping tabs 42 which are alternately removed at each end edge to leave three tabs 42. The tightening torque using such a gripping member 40 was measured as nearly 350 kg.cm.wt.

FIG. 4(1) shows a further gripping member 90, which is modified from the gripping member 80 in FIG. 3(1), and is provided with four gripping tabs including three adjacent tabs 82a, 82b and 82c away from each other by 60°, and one more tab 82d disposed in opposite to the tab 82b. As herein described, the gripping tabs may be not always located in a symmetrical relationship with each other.

The gripping member 92 shown in FIG. 4(2) has eight gripping tabs 94 each being formed with a convex end edge 96, which is to engage with the periphery of a conduit. In case that still the anti-withdrawal strength for the conduit is not sufficient, the number of gripping tabs may be increased to improve the fastening strength without increasing the tightening torque.

As illustrated in FIG. 4(3), the gripping member 40 may be formed so as to have a flat peripheral portion 41, and also may have gripping tabs each being in a form other than having a concave figure at the end edge portion thereof. Also, deviated from that in FIG. 2, the gripping member 40 may be located so that the outer tapered surface, other than the inner tapered surface, of gripping member 40 is to face the end of the coupling member 50.

According to the invention, the engagement through a minimized contact area, such as by forming the end edge of the tab as a convex surface, provides various advantages in that: a great deformation stress applied on gripping member by the conduit is reduced, the tightening torque required in gripping the conduits by the member to connect the conduits can be lowered to enable manual tightening by using a spanner or monkey wrench at a piping plant, the portions suffered from plastic deformation are minimized, and generation of corrosion during the use of a long period of time is prevented. Also, the conduits are prevented from lowering of mechanical strength, thereby increasing the anti-vibration property and preventing any breakdown of conduits.

What is claimed is:

1. A conduit coupling comprising:
   a coupling member having an entry bore and an external male thread;
   a fastening nut having a flanged portion with a central bore and a female thread to mesh with said thread of coupling member; and
   a gripping member formed as a conical spring washer having a central opening whose dimension is formed to be reduced where compressed axially, said gripping member formed with a plurality of gripping tabs to be engaged with a periphery of a conduit through a minimum contact area with a cylindrical surface of said conduit, each of said tabs being formed with a circumferentially extending convexly curved gripping edge.

* * * * *